(12) United States Patent
Mehler et al.

(10) Patent No.: US 8,090,904 B2
(45) Date of Patent: Jan. 3, 2012

(54) REDUCED HARD-DRIVE-CAPACITY DETECTION DEVICE

(75) Inventors: Dean L. Mehler, Wichita, KS (US); James P. Wiebe, Wichita, KS (US)

(73) Assignee: CRU Acquisition Group, LLC, Vancouver, WA (US)

( * ) Notice: Subject to any disclaimer, the term of this patent is extended or adjusted under 35 U.S.C. 154(b) by 349 days.

(21) Appl. No.: 12/364,431

(22) Filed: Feb. 2, 2009

(65) Prior Publication Data

US 2009/0198884 A1   Aug. 6, 2009

Related U.S. Application Data

(60) Provisional application No. 61/025,649, filed on Feb. 1, 2008.

(51) Int. Cl.
G06F 12/08 (2006.01)
(52) U.S. Cl. .................. 711/112; 711/E12.019
(58) Field of Classification Search ............... None
See application file for complete search history.

(56) References Cited

U.S. PATENT DOCUMENTS

| | | |
|---|---|---|
| 3,516,431 A | 6/1970 | Sundt et al. |
| 4,654,829 A | 3/1987 | Jiang et al. |
| 4,717,975 A | 1/1988 | Ogura et al. |
| 4,734,851 A | 3/1988 | Director |
| 4,811,293 A | 3/1989 | Knothe et al. |
| 5,144,660 A | 9/1992 | Rose |
| 5,245,606 A | 9/1993 | DeSouza |
| 5,268,960 A | 12/1993 | Hung et al. |
| 5,289,540 A | 2/1994 | Jones |
| 5,325,499 A | 6/1994 | Kummer et al. |
| 5,369,616 A | 11/1994 | Wells et al. |
| 5,557,674 A | 9/1996 | Yeow |
| 5,630,093 A | 5/1997 | Holzhammer et al. |
| 5,687,379 A | 11/1997 | Smith et al. |
| 5,721,665 A | 2/1998 | Schultz |
| 5,777,811 A | 7/1998 | Bodo |
| 5,835,954 A | 11/1998 | Duyanovich et al. |
| 5,861,873 A | 1/1999 | Kikinis |
| 5,953,199 A | 9/1999 | Owens |
| 5,953,513 A | 9/1999 | Saiki et al. |
| 5,966,732 A | 10/1999 | Assaf |
| 5,969,933 A | 10/1999 | Schultz et al. |
| 5,991,402 A | 11/1999 | Jia et al. |
| 6,041,385 A | 3/2000 | Shipman et al. |

(Continued)

FOREIGN PATENT DOCUMENTS

WO    9309495    5/1993

(Continued)

OTHER PUBLICATIONS

Tableau Frequently Asked Questions, http://replay.waybackmachine.org/20080107023115/www.tableau.com/index.php?pageid=faq, 12 pages, archived on Jan. 7, 2008.*

(Continued)

*Primary Examiner* — Kevin Verbrugge
(74) *Attorney, Agent, or Firm* — Kolisch Hartwell, P.C.

(57) ABSTRACT

The present disclosure relates to a device for detecting accessible capacity in an external hard drive. The disclosed device may detect reduced accessible capacity in an external hard drive due to an modification or deletion of either the Host-Protected Area or the Device Configuration Overlay table.

12 Claims, 4 Drawing Sheets

U.S. PATENT DOCUMENTS

| | | | |
|---|---|---|---|
| 6,041,394 | A | 3/2000 | Halligan et al. |
| 6,092,161 | A | 7/2000 | White et al. |
| 6,126,070 | A | 10/2000 | Fukuzumi |
| 6,173,377 | B1 | 1/2001 | Yanai et al. |
| 6,212,635 | B1 | 4/2001 | Reardon |
| 6,216,205 | B1 | 4/2001 | Chin et al. |
| 6,230,288 | B1 | 5/2001 | Kuo et al. |
| 6,330,648 | B1 | 12/2001 | Wambach et al. |
| 6,336,187 | B1 | 1/2002 | Kern et al. |
| 6,339,814 | B1 | 1/2002 | Iida |
| 6,345,368 | B1 | 2/2002 | Bergsten |
| 6,438,638 | B1 | 8/2002 | Jones et al. |
| 6,446,209 | B2 | 9/2002 | Kern et al. |
| 6,516,999 | B1 | 2/2003 | Belonoznik |
| 6,629,184 | B1 | 9/2003 | Berg et al. |
| 6,654,864 | B2 | 11/2003 | Shaath et al. |
| 6,727,894 | B1 | 4/2004 | Karidis et al. |
| 6,813,682 | B2 | 11/2004 | Bress et al. |
| 7,159,086 | B2 | 1/2007 | Bress et al. |
| 7,228,379 | B2 | 6/2007 | Bress et al. |
| 7,287,257 | B2 | 10/2007 | Meza |
| 7,584,334 | B2 * | 9/2009 | Bress et al. .................. 711/154 |
| 2003/0023867 | A1 | 1/2003 | Thibadeau |
| 2004/0078514 | A1 | 4/2004 | Kung et al. |
| 2005/0182510 | A1 * | 8/2005 | Bress et al. .................. 700/214 |
| 2006/0080517 | A1 * | 4/2006 | Brown ........................ 711/163 |

FOREIGN PATENT DOCUMENTS

| | | |
|---|---|---|
| WO | 9313477 | 7/1993 |
| WO | 0188724 | 11/2001 |

OTHER PUBLICATIONS

Intelligent Computer Solutions, web page titled "ImageMASSter Product Lines," copyright 2007 Intelligent Computer Solutions Inc., as retrieved from web.archive.org/web/20070629171122/icsforensic.com on May 28, 2009 (2 pages).

Intelligent Computer Solutions, web page titled "Super DriveLock", copyright 1999-2009 Intelligent Computer Solutions, Inc, retrieved from http://www.icsforensic.com/index.cfm/action/product.show/id_product/44e10f44-cb9c-4d02-b903-3298e32be1ed/id_category/a301e273-e5d1-4t7f-b1e4-bd5334c0f310 on May 28, 2009 (2 pages).

Intelligent Computer Solutions, web page for ImageMASSter Solo-3 Forensic, copyright 2007 Intelligent Computer Solutions, Inc., as retrieved from http://web.archive.org/web/20070802104031/www.icsforensic.com/index.cfm/action/product.show/id_product/e9ee9ade-236e-40fa-97f9-5adaed3b6cfb on May 29, 2009 (1 page).

Tableau, LLC, "Frequently Asked Questions," web pages downloaded from www.tableau.com/index.php?/pageid=faq, © Sep. 2009 Tableau, LLC, downloaded on Feb. 2, 2009 (12 sheets).

Tableau, LLC, "T35i vs. FastBloc LE Comparison," © 2006 Tableau, LLC (1 sheet).

Tableau, LLC, "T35es eSATA Forensic Bridge Product Brief," © 2008 Tableau, LLC (1 sheet).

Tableau, LLC, Tableau T35e/T35e-RW QuickStart Guide, 2007, 1 page.

Tableau, LLC, Tableau Classic Family Documentation, Nov. 14, 2007, 4 pages.

Tableau, LLC, Tableau Disk Monitor Users' Guide, 2006, 18 pages.

Friedhelm Schmidt, The SCSC BUS and IDE Interface, 1995, 12 pages, Chapter 8, Addison-Wesley.

Peter Gutmann, Secure Deletion of Data from Magnetic and Solid-State Memory, Proceedings of the USENIX Security Symposium, Jul. 22, 1996, 20 page.

Patent Abstracts of Japan, Publication No. 06337781, Dec. 6, 1994, 4 pages, NEC Home Electron Ltd.

Patent Abstracts of Japan, vol. 1995, No. 05, Jun. 30, 1995 & JP 7037207, Feb. 7, 1995, 7 pages.

Pete McLean, Device Configuration Overlay Proposal, Oct. 24, 2000, 16 pages.

Univac, Univac History, Feb. 2006, 5 pages, http://en.wikipedia.org/wiki/Univac.

Microsoft, Computer Dictionary, 1999, pages 102, 321 and 349.

* cited by examiner

REDUCED HARD-DRIVE-CAPACITY DETECTION DEVICE

CROSS REFERENCE TO RELATED APPLICATIONS

This application claims priority under 35 U.S.C. §119(e) to U.S. Provisional Patent Application No. 61/025,649 entitled "Reduced Hard-drive-capacity detection Device," filed Feb. 1, 2008, the disclosure of which is incorporated herein by reference.

BACKGROUND

The present disclosure relates to hard-drive-capacity detection devices, and more specifically to a bridge device that is configured to connect to a stand-alone hard drive, such as a disk hard drive, not resident in a stand-alone computer or which may be used to connect such an external hard drive to a host computer via a non-native bus, and which detects reduced accessible capacity in the external drive.

Host-computer-based programs that allow a user to detect and/or modify a Host Protected Area ("HPA") or a Device Configuration Overlay ("DCO") table on the host-computer native or resident hard drive are known. These programs allow a user to effectively reduce the accessible capacity of the hard drive. The accessible capacity of a hard drive, which also may be referred to as the native capacity, is that portion of the full capacity of the hard drive (i.e., the factory default capacity of the hard drive) that is accessible to an operating system of the host computer in which the hard drive is resident or to which the hard drive may be connected. After the program(s) is/are executed to modify the HPA or DCO, the host-computer operating system cannot access a portion of the memory space in the hard drive. That portion of the hard drive is effectively "hidden" from the operating system.

Before the program is executed to reduce the available accessible capacity on the hard drive, data may be written to the area of the hard drive that is rendered inaccessible by the program. Data written to the inaccessible portion of the hard drive is also hidden from the operating system. Although the data is hidden from the operating system, it is still stored on the hard drive.

Software programs that are able to detect HPA and/or DCO reduced accessible capacity are known in the art. However, known software programs designed to detect HPA and/or DCO reduced accessible capacity are resident and executed on a host computer and do not work with all hard drives. Examples of native buses include Integrated Device Electronics (IDE) or Serial AT Attachment (SATA) bus. External hard drives connected to the host computer via non-native buses are problematic for current detection programs. For example, known software programs cannot detect reduced accessible capacity when the external hard drive is connected to the host computer via a Universal Serial Bus (USB) or IEEE 1393—FireWire™. Thus, many external hard drives must be internally mounted to the host computer via the native buses in order for known detection programs to function properly, which is often time-consuming and inefficient.

Detection of HPA and/or DCO reduced accessible capacity in hard drives may be important during computer forensic investigation. For example, data that is important to an investigation may be stored on the portion of the hard drive that cannot be accessed by the operating system due to HPA and/or DCO reduced accessible capacity. When an image of the hard drive is taken for analysis, the data stored on the inaccessible portion of the hard drive may not be captured in the image. Thus, to perform a complete and effective forensic analysis of the hard drive, it may be useful for the investigator to be able to know if there is HPA and/or DCO reduced hard-drive capacity.

DETAILED DESCRIPTION

The detailed description that follows is presented largely in terms of algorithms and symbolic representations of operation of data bits within a computer memory. These algorithmic descriptions and representations are the means used by those skilled in the data processing arts to most effectively convey the substance of their work to others skilled in the art. It may be preferred to implement and describe a program as various interconnected distinct software modules or features. This is not necessary, as software, firmware, and hardware may be configured many different ways, and may be aggregated into a single processor and program with unclear boundaries.

An algorithm is generally considered to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. When stored, they can be stored, transferred, combined, compared, and otherwise manipulated. When stored, they may be stored in any computer-readable medium. As a convention, these signals may be referred to as bits, values, elements, symbols, characters, images, terms, numbers, or the like. These and similar terms may be associated with appropriate physical quantities and are convenient labels applied to these quantities.

The present disclosure also relates to apparatus for performing these operations. This apparatus may be specially constructed for the required purposes or it may comprise a general-purpose computer selectively activated or reconfigured by a computer program stored in the computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that a program embodying the disclosed methods need not reside in a single memory, or even a single machine. Various portions, modules or features of it can reside in separate memories, or even separate machines. The separate machines may be connected directly, or through a network, such as a local access network (LAN), or a global network, such as what is presently known as Internet-1. Similarly, the users need not be collocated with each other, but each only with a machine that houses a portion of the program.

Figure 1:
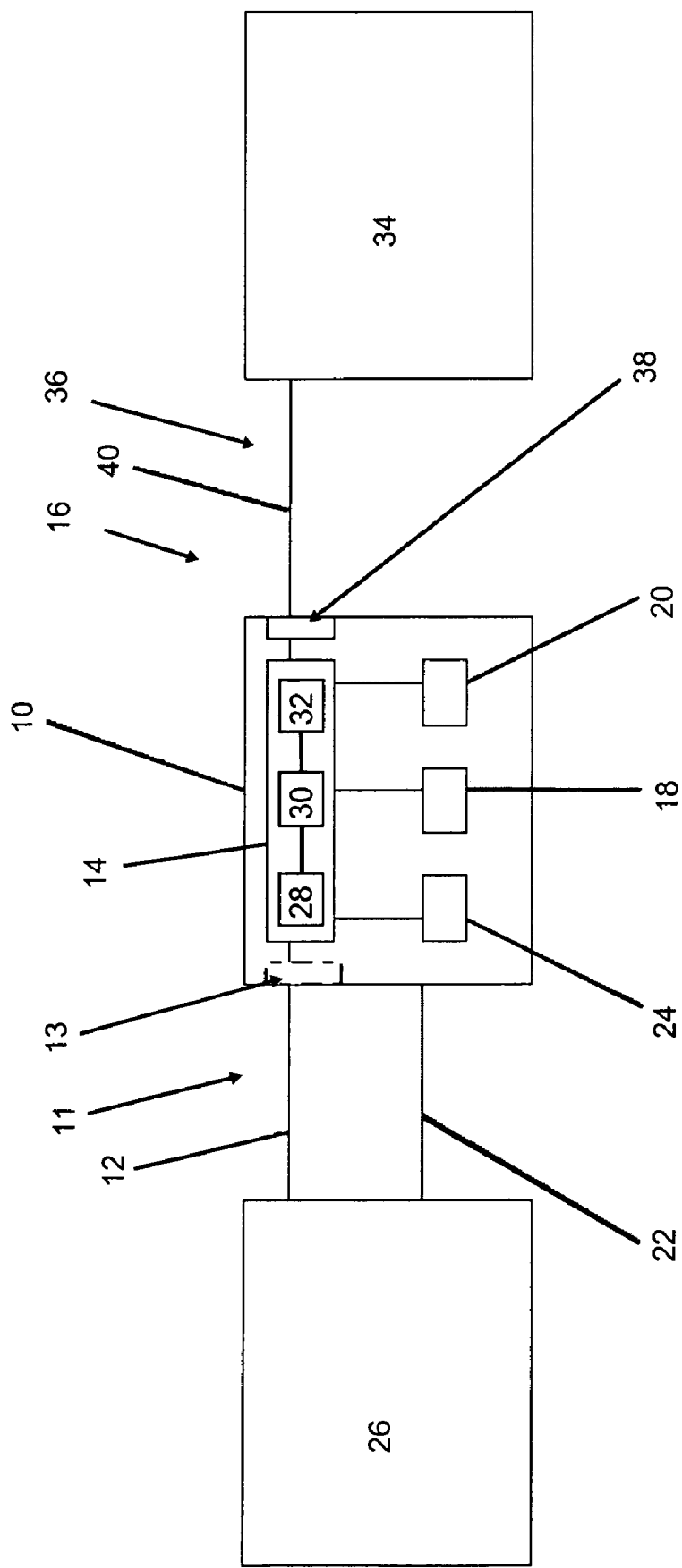
FIG. 1 shows a block diagram of an example of a hard-drive reduced-capacity detection device.

With reference now to FIG. 1, which shows an example of a Host Protected Area ("HPA") and/or Device Configuration Overlay ("DCO") reduced-capacity external-hard-drive-detection device 10 ("device"). Device 10 may include one or more of a hard-drive connection mechanism 11, a bridge 14, a computer connection mechanism 16, an indicator 18, a power source 20, a hard drive power connector 22, and a power switch 24.

Hard drive connection mechanism 11 may be configured to connect device 10 to an external hard drive 26. Additionally, connection mechanism 11 may permit device 10 to communicate with hard drive 26 coupled via a communication link 12 connected to the hard drive mechanism 11. For example, hard drive connection mechanism 11 may be a communication port 13 operably coupled between bridge 14 and communication link 12. Alternatively, connection mechanism 11 may include a connection link 12, such as a cable or other wired or wireless means of communication compatible with hard drive connection mechanism 11 and hard drive 26.

Connection mechanism may be coupled to a hard drive that supports appropriate hard-drive commands, such as the commands discussed below, to permit detection of reduced capacity. Examples of hard drives that may be connected to device 10 via connection mechanism 11 include hard drives of the following types: 2.5" ATAPI, 2.5" or 3.5" SATA, 2.5" or 3.5" IDE, 1.8" Toshiba™, 1.8" Hitachi™, MicroDrive, or PCM-CIA. As used herein a hard drive may be any form of computer memory providing permanent storage. Once hard drive 26 is coupled to device 10 via connection mechanism 11, device 10 may communicate with hard drive 26.

Connection mechanism 11 may be coupled to bridge 14. Bridge 14 may be any device that communicates with a hard drive coupled to it via the hard-drive connection mechanism, and may include, for example, a disk controller 28, a processor 30, and a memory 32 coupled to processor 30 for storing data and operating instructions. Bridge 14 may be of a type known in the art, such as one of the Oxford Semiconductor™ 936, 934, 924, 922, or 911+ bridge chips.

Processor 30 may be any device, such as a computer, microprocessor, or other logical unit adapted to execute operating instructions. Operating instructions may be embodied as hardware, software, or firmware. When device 10 is connected to hard drive 26 via connection mechanism 11 as described above, bridge 14 may communicate with hard drive 26. For example, bridge 14 may send instructions to and receive data from hard drive 26. Processor 30 may execute only instructions stored in memory 32.

In an exemplary embodiment, controller 28 may communicate commands or instructions configured to parse data from hard drive 26 coupled to device 10 to detect HPA and/or DCO reduced accessible capacity in hard drive 26. In such an embodiment, bridge 14 may be "write blocked" i.e., programmed to prohibit writing or otherwise changing the data on the hard drive as data is parsed. An example of a process capable of detecting HPA and/or DCO reduced accessible capacity in hard drive 26 is discussed in detail below with reference to FIGS. 2A-C.

Device 10 may connect to an independent (stand-alone or self-contained) computer 34 via communication link 36 or any mechanism connectable to communication link 36. Optionally, device 10 may include communication link 36 in connection mechanism 16. For example, communication link 36 may be operatively connected to device 10 at computer connection mechanism 16, which may be a communication port 38 operably coupled to bridge 14. Correspondingly, bridge 14 may transmit data to or receive data from independent computer 34 when communication link 36 is connected between the independent computer and computer connection mechanism 16. For example, data stored in hard drive 26 coupled to device 10 via connection mechanism 11 may be transferred by bridge 14 to the independent computer via computer connection mechanism 16. Exemplary computer communication ports that may function as computer connection mechanism 16 include a Universal Serial Bus (USB) 2.0 port or an IEEE 1394a/b port ("FireWire™ port"). Communication link 36 may be a cable 40 or other wired or wireless means of communication compatible with bridge 14 and computer 34, and if appropriate computer connection mechanism 16. For example, a USB or FireWire™ 400 or 800 cable may connect device 10 to the computer to facilitate communication.

Device 10 may include one or more indicators 18 to indicate the status of device 10. Exemplary indicators include a data bit communicated to computer 34, and/or visible, audio, tactile, or other sensory outputs. For example, visible indicators 18, such as one or more light-emitting diodes (LEDs), may be devices coupled to bridge 14 to show to the user that device 10 is receiving power, power is being output to a hard drive 26 coupled to device 10, computer connection mechanism 16 is active, controller 28 has activated the "write block" function, and/or the hard drive coupled to device 10 is active. Device 10 may also include an indicator 18 to exhibit that bridge 14 has encountered an error or has detected reduced accessible capacity in a coupled hard drive. Indicators 18 may indicate multiple conditions and may have one or more modes, values, or other operating states, such as on/off and slow/fast blink conditions, to indicate multiple items of information. Each indicator operating state may indicate different information in relation to the operation of bridge 14. Indicators 18 may function while a host computer 34 and a hard drive 26 is operatively connected to device 10, or when only a hard drive 26 is connected to device 10.

Device 10 may be electrically charged by any suitable power source 20. Examples of power sources 20 include an AC-to-DC adapter and a 4-pin power adapter. Device 10 also may include an on/off power switch 24 to regulate power to the device. Power source 20 also may provide power to hard drive 26 coupled to device 10 through hard drive power connector 22. An example of a hard drive power connector 22 is a pin-and-socket connector, such as a Molex™ power connector.

HPA and/or DCO Reduced Hard-Drive-Capacity Detection Process

Figure 2A:
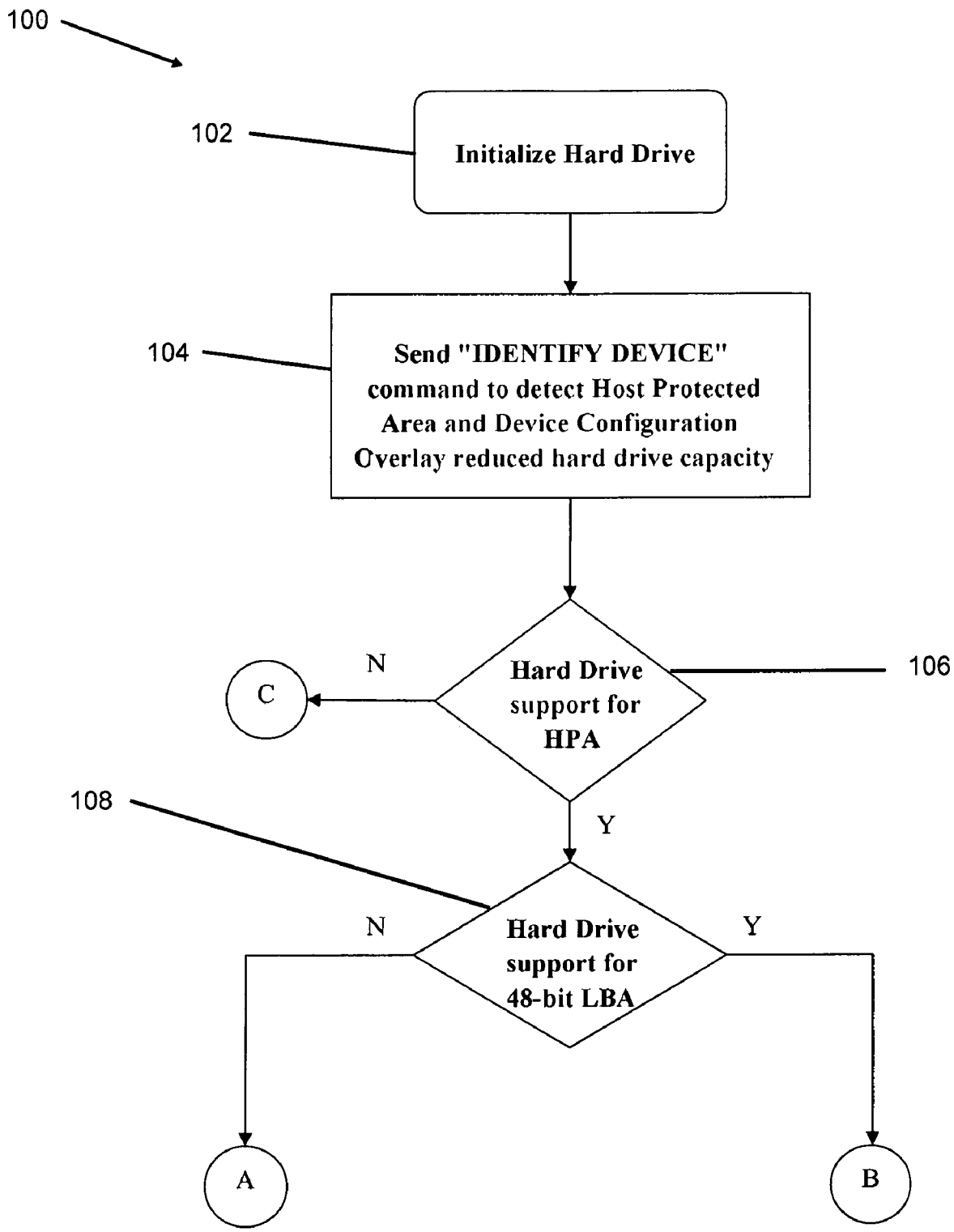
FIGS. 2A-2C show a flow chart of an example of a process by which a hard drive reduced-capacity-detection device may detect reduced accessible capacity.
Figure 2B:
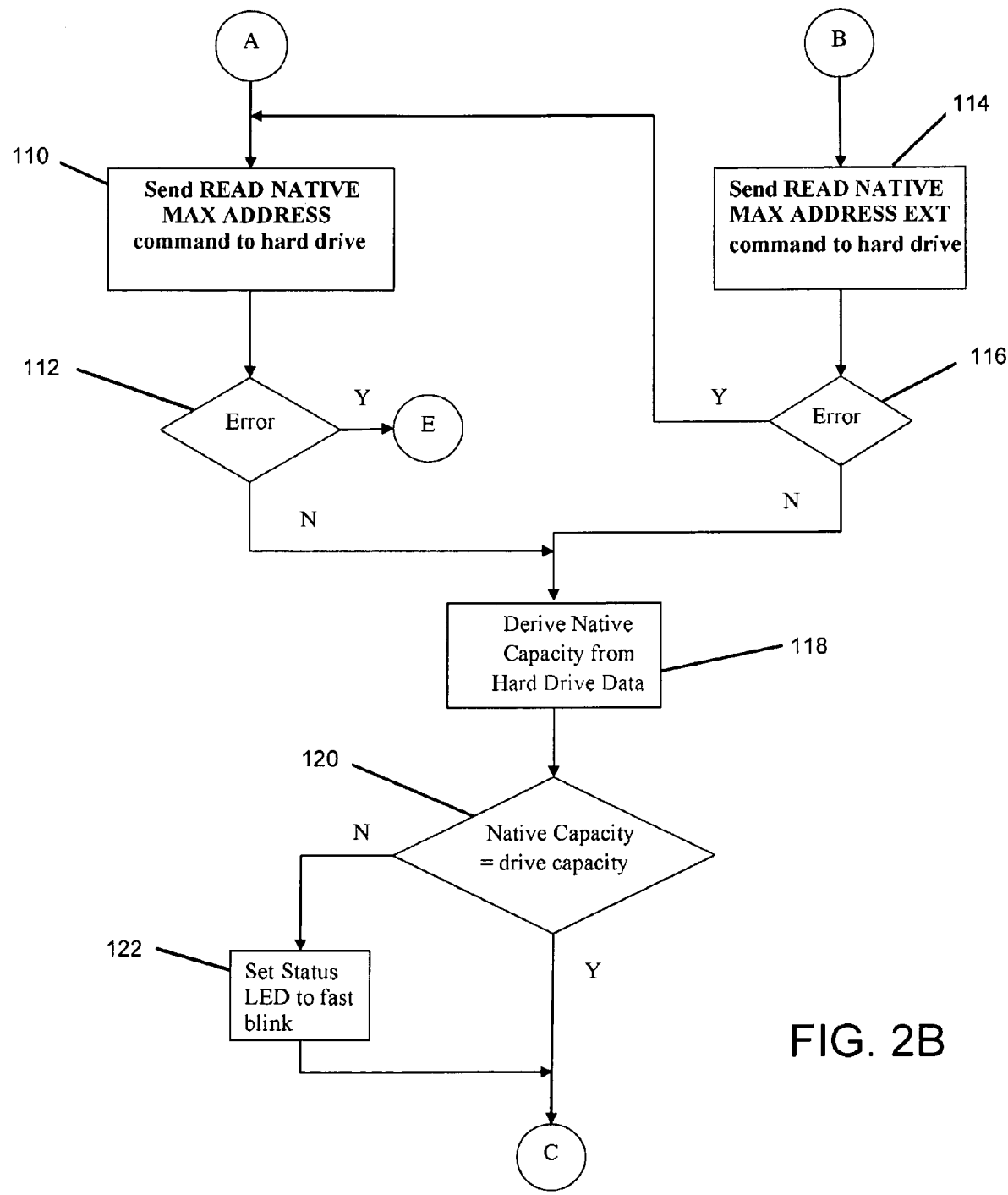
Figure 2C:
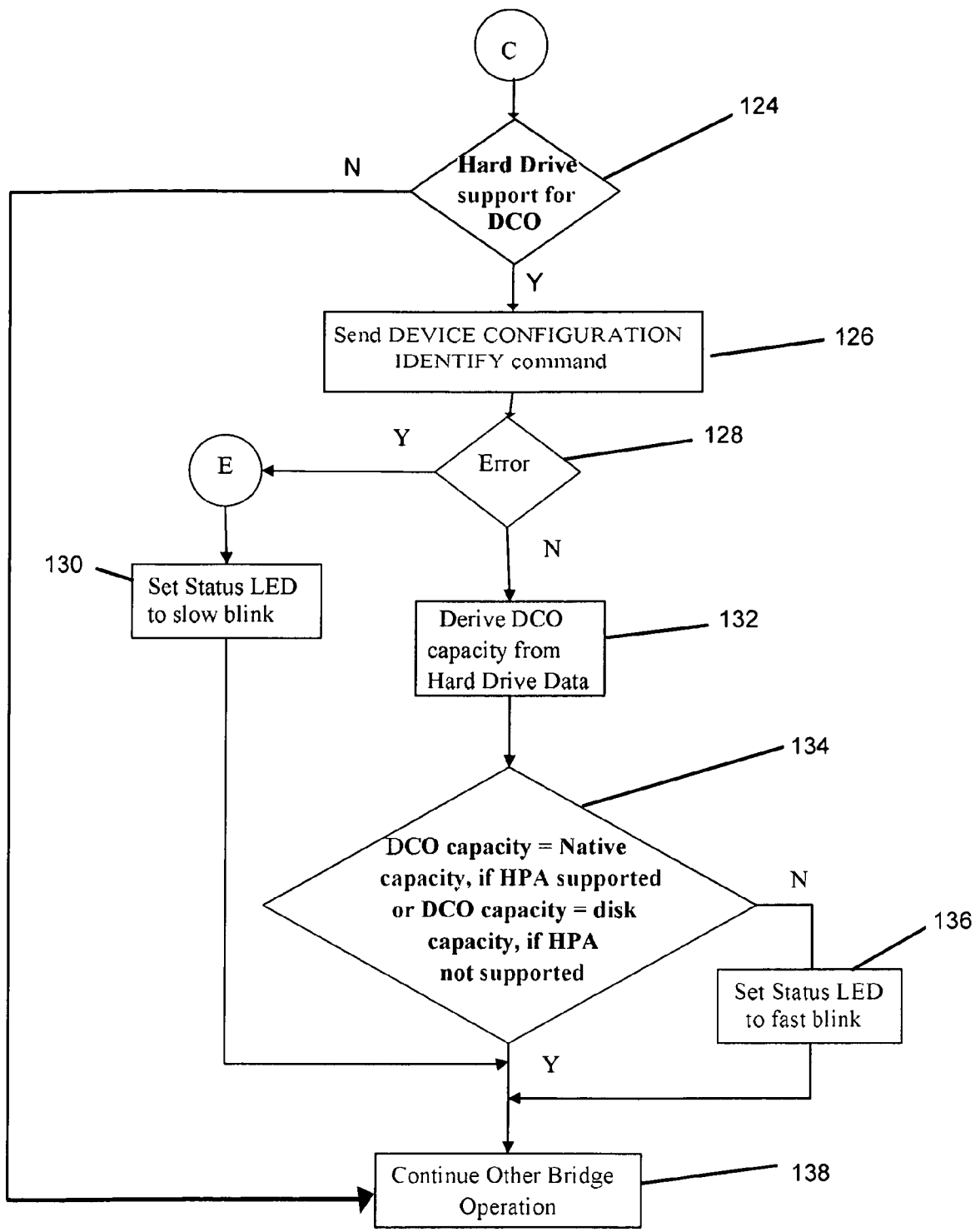

FIGS. 2A-2C show an example of a process 100 by which device 10 may detect whether a coupled hard drive 26 contains HPA and/or DCO reduced capacity (the "detection process"). Beginning with FIG. 2A, controller 28 begins the detection process by initializing hard drive 26, which is shown at step 102. Hard drive 26 may be initialized using instructions stored in memory 32 and executed by processor 30.

After hard drive 26 has been initialized, device 10 may begin parsing information from hard drive 26 at step 104. This may be achieved by using instructions programmed in controller 28. An example of such an instruction is the "IDENTIFY DEVICE" command, which may return the accessible capacity of hard drive 26. However, the "IDENTIFY DEVICE" command data parsing may be modified to include detection of support for HPA and/or DCO reduced capacity functions. For example, instructions may be programmed into controller 28 to facilitate detection of reduced hard-drive capacity. Such instructions may be programmed according to the ATA/ATAPI-7 V1 standard.

At step 106, controller 28 may execute programmed instructions to determine whether hard drive 26 supports HPA. If the hard drive does not support HPA, device 10 has determined that the hard-drive accessible capacity is not reduced due to modification of the HPA. In that case, the detection process skips forward to detection of DCO reduced accessible capacity, which is described below with reference to FIG. 2C beginning at step 124.

However, if controller 28 detects that the coupled hard drive does support HPA, programmed instructions are executed to determine whether hard drive 26 supports 48-bit Logical Block Addressing (LBA) at step 108. If hard drive 26 does not support 48-bit LBA, then the detection process 100 continues at "A" in FIG. 2B. If hard drive does support 48-bit LBA, then the detection process 100 continues at "B" in FIG. 2B.

FIG. 2B shows the continuation of the example of a detection process 100 partially described above with reference to FIG. 2A. Beginning with "A" in FIG. 2B, controller 28 executes instructions to determine the maximum native capacity of hard drive 26, as shown at step 110. For example, controller 28 may execute a "READ NATIVE MAX ADDRESS" command. If an error is returned to controller 28 upon execution of the instruction, device 10 may activate an indicator 18 to provide a corresponding sensory output, as shown at step 112. Controller 28 may thereafter continue with any other programmed instructions, which is indicated in FIG. 2C at step 138, or cause device to halt operation.

Moving now to "B" in FIG. 2B, at step 114, controller 28 may execute an instruction to retrieve the maximum native capacity of hard drive 26. For example, controller 28 may execute the "READ NATIVE MAX ADDRESS EXT" command to retrieve the maximum native capacity. If, at step 114, an error is returned upon execution of the instruction, detection process 100 may return to "A", described above with reference to steps 110 and 112 and proceed accordingly.

If no error is returned during performance of the processes described following flow connectors "A" or "B", then controller 28 received the maximum native capacity of hard drive (i.e., the maximum native capacity was returned to controller 28 in response to execution of the "READ NATIVE MAX ADDRESS" or "READ NATIVE MAX ADDRESS EXT"). As indicated at step 118, the maximum native capacity may be derived from the hard drive data.

Next, as shown at step 120, controller 28 compares the accessible capacity and maximum native capacity. If they are equal, then hard drive 26 does not have HPA reduced capacity, and detection process 100 continues to "C". If, however, the hard drive and native capacities are not equal, then device 10 has determined that hard drive 26 has HPA reduced capacity, and further analysis must be conducted on the hard drive to derive all of the "hidden" data. As shown at step 122, controller 28 may direct indicator 18 to provide a corresponding sensory output. Controller 28 then may continue to determine whether hard drive 26 has DCO reduced capacity at "C".

FIG. 2C shows the continuation of an example of detection process 100. Specifically, FIG. 2C shows the process by which DCO reduced hard-drive accessible capacity may be detected by device 10. First, as shown at step 124, controller 28 executes instructions to determine whether hard drive 26 supports DCO. If, upon execution of the appropriate instruction, controller 28 determines hard drive 26 does not support DCO, then device 10 does not need to determine whether the hard drive has reduced accessible capacity. Controller 28 may thereafter execute other programmed instructions, as shown at step 138.

Controller 28 may execute appropriate instructions to determine whether hard drive 26 supports DCO, at step 126. For example, controller 28 may execute the "DEVICE CONFIGURATION IDENTIFY" command. As shown at step 128, if an error is returned to controller 28 upon execution of the instruction, then, as shown at step 130, controller 28 may set indicator 18 to provide a corresponding sensory output. Controller 28 may thereafter execute any other instructions programmed therein, as shown at step 138, or may halt device 10. However, if controller 28 does not encounter an error, the DCO factory default disk capacity of hard drive 26 may be returned, as shown at step 132. This value may be determined from data within hard drive 26.

At step 134, controller 28 may compare the DCO factory default capacity to either the (1) native capacity of the hard drive if HPA is supported by the hard drive; or (2) the accessible capacity of the hard drive if HPA is not supported. If controller 28 determines the DCO factory default capacity is not equal to (specifically, greater than) the properly compared capacity, then controller 28 has detected that hard drive 26 has DCO reduced capacity. At step 136, controller 28 sets indicator 18 to provide the appropriate sensory output. However, if the DCO factory default capacity is determined to be equal to the properly compared capacity at step 134, then controller 28 failed to detect DCO reduced capacity.

If device 10 detects reduced capacity in hard drive 26, then an investigator may take further steps to derive all of the information from the hard drive. Whether the hard drive does or does not have reduced capacity, controller 28 may continue to execute any additional programmed instructions as shown at step 138.

It is believed that the disclosure set forth above encompasses multiple distinct inventions with independent utility. While each of these inventions has been disclosed in a preferred form or method, the specific embodiments and/or methods thereof as disclosed and illustrated therein are not to be considered in a limiting sense, as numerous variations are possible. The present disclosure includes all novel and non-obvious combinations and subcombinations of the various elements, features, functions, properties, steps and/or methods disclosed herein. Similarly, where any disclosure above recites "a" or "a first" element, step of a method, or the equivalent thereof, such disclosure should be understood to include incorporation of one or more such elements or steps, neither requiring not excluding two or more such elements or steps. These and other components described and illustrated herein may be incorporated with fewer or more of the various components discussed.

Inventions embodied in various combinations and subcombinations of features, functions, elements and/or properties may be claimed through presentation of claims in a related application.

We claim:

1. A device for detecting reduced capacity of a stand-alone hard drive having a host protected area or hard-drive-device-configuration-overlay table that has been modified to reduce the hard-drive accessible capacity, the device comprising:
 a bridge including a controller having a processor and memory, the memory storing instructions executable by the processor;
 a hard-drive-connection mechanism coupled to the bridge and configured to be connected to the hard drive to provide data communication between the bridge and the hard drive when the hard-drive-connection mechanism is connected to the hard drive;
 an indicator for providing sensory output;
 wherein the bridge is configured to obtain information from the hard drive when the hard-drive-connection mechanism is connected to the hard drive and the bridge is not connected to a host computer, and the controller is configured to parse the information obtained from the hard drive by the bridge to detect reduced accessible capacity in the hard drive and activate the indicator to provide sensory output indicating detection of reduced accessible capacity.

2. The device of claim 1 wherein the indicator is a multi-function light-emitting diode.

3. The device of claim 1 further comprising a computer connection mechanism coupled to the bridge and configured to connect via a communication link to an independent computer for communication between the bridge and the computer.

4. The device of claim 3 wherein the bridge is configured to transfer data stored on the hard drive when coupled to the device to the independent computer when the independent computer is connected to the bridge via the communication link.

5. The device of claim 1 wherein the controller is programmed to prevent the bridge from writing data onto the hard drive.

6. A reduced hard-drive-capacity detection device comprising:
   a bridge including memory, a processor, and one or more programs stored on the memory and configured to be executed by the processor;
   a hard-drive-connection mechanism configured to couple the bridge to an external hard drive to transmit and receive data between the bridge and the hard drive; and
   a computer-connection mechanism configured to couple the bridge to an independent computer via a connected communication link to communicate data stored on the hard drive to the independent computer;
   wherein, when the one or more instructions stored on the memory are executed by the processor and the bridge is not coupled to the independent computer, the bridge parses information stored on the hard drive to detect reduced accessible capacity in the hard drive.

7. The reduced hard-drive-capacity detection device of claim 6 further comprising an indicator configured to provide sensory output, wherein the bridge activates the indicator to provide sensory output indicating detection of reduced accessible capacity.

8. The reduced hard-drive-capacity detection device of claim 6 wherein the computer-connection mechanism includes a communication port to couple the bridge to the computer via the communication link.

9. The reduced hard-drive-capacity detection device of claim 8 wherein the bridge is configured to selectively transmit data on the hard drive to the computer when the hard drive is coupled to the bridge by the hard-drive-connection mechanism and the computer is coupled to the bridge by the communication port.

10. The reduced hard-drive-capacity detection device of claim 6 wherein the memory includes programmed instructions that when executed by the processor prevent the bridge from writing data to the hard drive while detecting reduced accessible capacity on the hard drive.

11. A method of detecting reduced accessible capacity in a stand-alone hard drive comprising:
    initializing the hard drive while the hard drive is not part of a stand-alone computer;
    determining whether the hard drive supports host-protected-area or device-configuration-overlay reduced hard-drive accessible capacity;
    interrogating the hard drive to determine the full capacity of the hard drive from hard drive data;
    interrogating the hard drive to determine the accessible capacity of the hard drive;
    comparing the available accessible capacity to the full capacity to determine whether the accessible capacity of the hard drive has been reduced; and
    providing sensory output indicating detection of reduced accessible capacity when reduced accessible capacity on the hard drive is detected
    wherein initializing, determining, interrogating, comparing, and providing are performed by a reduced-hard-drive-capacity detection device while the detection device is not connected to a host computer.

12. The method of claim 11 wherein determining whether the hard drive supports reduced hard-drive accessible capacity includes determining whether the hard drive supports host-protected-area and device-configuration-overlay reduced hard-drive accessible capacity.

* * * * *